(12) United States Patent
Singer

(10) Patent No.: US 10,992,946 B2
(45) Date of Patent: Apr. 27, 2021

(54) CODING OF VIDEO AND AUDIO WITH INITIALIZATION FRAGMENTS

(71) Applicant: Apple Inc., Cupertino, CA (US)

(72) Inventor: David W. Singer, San Franciso, CA (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 16/293,487

(22) Filed: Mar. 5, 2019

(65) Prior Publication Data

US 2019/0200031 A1    Jun. 27, 2019

Related U.S. Application Data

(60) Continuation of application No. 15/247,846, filed on Aug. 25, 2016, now Pat. No. 10,264,274, which is a
(Continued)

(51) Int. Cl.
*H04N 19/46* (2014.01)
*H04N 19/70* (2014.01)
(Continued)

(52) U.S. Cl.
CPC .......... *H04N 19/46* (2014.11); *H04N 19/114* (2014.11); *H04N 19/177* (2014.11); *H04N 19/70* (2014.11)

(58) Field of Classification Search
CPC ...... H04N 19/46; H04N 19/70; H04N 19/114; H04N 19/177
See application file for complete search history.

(56) References Cited

U.S. PATENT DOCUMENTS

| | | |
|---|---|---|
| 5,150,209 A | 9/1992 | Baker et al. |
| 5,473,376 A | 12/1995 | Auyeung |
| | (Continued) | |

FOREIGN PATENT DOCUMENTS

| | | |
|---|---|---|
| DE | 10343817 A1 | 4/2005 |
| EP | 0606856 A2 | 7/1994 |
| | (Continued) | |

OTHER PUBLICATIONS

Taiwanese Office Action, dated Nov. 20, 2015, from corresponding Taiwanese Patent Application No. 102114430, filed Apr. 23, 2013.
(Continued)

*Primary Examiner* — David E Harvey
(74) *Attorney, Agent, or Firm* — BakerHostetler

(57) ABSTRACT

A new file format for coded video data is provided. A decoder may identify patterns in the coded video data in order to make the decoding process and/or display of data more efficient. Such patterns may be predefined and stored at the decoder, may be defined by each encoder and exchanged during terminal initialization, or may be transmitted and/or stored with the associated video data. Initialization information associated with the fragments of video data may also provide for carouseling initialization updates such that the initialization fragments may indicate either that the initialization information should be updated or that the decoder should be re-initialized. Additionally, media files or segments may be broken into fragments and each segment may have an index to provide for random access to the media data of the segment.

21 Claims, 9 Drawing Sheets

Related U.S. Application Data division of application No. 13/631,194, filed on Sep. 28, 2012, now abandoned.

(60) Provisional application No. 61/637,068, filed on Apr. 23, 2012, provisional application No. 61/637,263, filed on Apr. 23, 2012.

(51) Int. Cl.
*H04N 19/114* (2014.01)
*H04N 19/177* (2014.01)

(56) References Cited

U.S. PATENT DOCUMENTS

| | | | |
|---|---|---|---|
| 5,566,089 A | 10/1996 | Hoogenboom | |
| 5,745,379 A * | 4/1998 | Lewis | H04N 5/275 709/247 |
| 5,815,601 A | 9/1998 | Katata | |
| 5,825,830 A * | 10/1998 | Kopf | G06T 9/004 375/340 |
| 5,841,376 A * | 11/1998 | Hayashi | G06T 9/005 341/51 |
| 5,841,935 A | 11/1998 | Asai et al. | |
| 5,877,711 A * | 3/1999 | Craft | G06T 9/005 341/51 |
| 6,278,735 B1 | 8/2001 | Mohsenian | |
| 6,310,981 B1 | 10/2001 | Makiyama | |
| 6,404,814 B1 | 6/2002 | Apostolopoulos | |
| 6,404,817 B1 | 6/2002 | Saha et al. | |
| 6,473,531 B1 | 10/2002 | Kunitake | |
| 6,493,385 B1 | 12/2002 | Sekiguchi | |
| 6,667,700 B1 * | 12/2003 | McCanne | H03M 7/30 341/50 |
| 6,909,745 B1 | 6/2005 | Puri | |
| 6,959,044 B1 | 10/2005 | Jin et al. | |
| 7,003,039 B2 * | 2/2006 | Zakhor | H04N 19/51 375/240.16 |
| 7,006,567 B2 | 2/2006 | Frossard et al. | |
| 7,536,705 B1 | 5/2009 | Boucher et al. | |
| 8,416,858 B2 | 4/2013 | Rodriguez | |
| 8,804,818 B2 | 8/2014 | Puri | |
| 9,113,172 B2 | 8/2015 | Hong | |
| 9,402,082 B2 | 7/2016 | Deshpande | |
| 2002/0101605 A1 * | 8/2002 | Zeck | H04N 19/97 358/1.15 |
| 2003/0090702 A1 * | 5/2003 | Trelewicz | G06K 15/1814 358/1.15 |
| 2003/0163781 A1 | 8/2003 | Visharam | |
| 2007/0160152 A1 * | 7/2007 | Yoshimoto | H04N 19/61 375/240.26 |
| 2007/0186235 A1 | 8/2007 | Jarman et al. | |
| 2009/0092191 A1 | 4/2009 | Otsuka | |
| 2009/0196517 A1 | 8/2009 | Divorra Escoda | |
| 2010/0034294 A1 | 2/2010 | Jang | |
| 2010/0142813 A1 * | 6/2010 | Abdo | H04N 1/646 382/166 |
| 2010/0195724 A1 * | 8/2010 | Yoshida | H04N 19/507 375/240.12 |
| 2010/0254453 A1 | 10/2010 | Dane et al. | |
| 2011/0158307 A1 * | 6/2011 | Lee | H03M 7/3088 375/240 |
| 2011/0216836 A1 | 9/2011 | Luo | |
| 2011/0228847 A1 | 9/2011 | Orlin et al. | |
| 2012/0016965 A1 | 1/2012 | Chen et al. | |
| 2012/0121188 A1 * | 5/2012 | Kenji | H04N 19/174 382/196 |
| 2012/0230390 A1 | 9/2012 | Akkor | |
| 2013/0185319 A1 * | 7/2013 | Reilly | H03M 7/3086 707/758 |
| 2014/0192075 A1 * | 7/2014 | Stamoulis | G06T 11/40 345/549 |
| 2016/0366433 A1 | 12/2016 | Singer | |

FOREIGN PATENT DOCUMENTS

| | | |
|---|---|---|
| JP | 08087575 A1 | 4/1996 |
| JP | 411262005 A1 | 9/1999 |
| TW | 200742442 | 11/2007 |
| WO | 2001063937 A3 | 8/2001 |
| WO | 2004030369 A1 | 4/2004 |

OTHER PUBLICATIONS

Taiwanese Office Action, dated Mar. 12, 2015, from corresponding Taiwanese Patent Application No. 102114430, filed Apr. 23, 2013.
International Search Report, dated Sep. 30, 2013, from corresponding International Application No. PCT/US2013/036808 filed Apr. 16, 2013.
Yokoyama, "Adaptive GOP Structure Selection for Real-Time MPEG-2 Video Encoding," IEEE, Proceedings of International Conference on Image Processing, Sep. 10, 2000, vol. 2, pp. 832-835.
Park et al., "Improve SVC Coding Efficiency by Adaptive GOP Structure (SVC CE2)," Joint Video Team (JVT) of ISO/ IEC MPEG & ITU-T VCEG (ISO/IEC JTC1/SC29/WG11 and ITU-T SG16 Q.6), 15th Meeting: Busan, KR, Apr. 16-22, 2005, Apr. 17, 2005.
Zhao et al., "Parameterized RPS Models," Joint Collaborative Team on Video Coding (JCT-VC) of ITU-T SG16 WP3 and ISO/IEC JTC 1/SC 29/WG11, 9th Meeting: Geneva, CH Apr. 27-May 7, 2012, Apr. 17, 2012.
Zatt et al., "GOP Structure Adaptive to the Video Content for Efficient H.264/AVC Encoding," Proceedings of 2010 IEEE 17th International Conference on Image Processing, Sep. 26-29, 2010, Hong Kong, Sep. 26, 2010, pp. 3053-3056.
Kang et al., "Coding Order Decision of B Frames for Rate-Distortion Performance Improvement in Single-View Video and Multview Video Coding," IEEE Transactions on Image Processing, vol. 19, No. 8, Aug. 2010, pp. 2029-2041.

\* cited by examiner

200

300

400

500

600

700

800

900

CODING OF VIDEO AND AUDIO WITH INITIALIZATION FRAGMENTS

CROSS REFERENCE TO RELATED APPLICATIONS

This application is a Continuation of Application of U.S. patent application Ser. No. 15/247,846, filed Aug. 25, 2016, which is a Divisional Application of U.S. patent application Ser. No. 13/631,194, filed Sep. 28, 2012, which claims the benefit of U.S. Provisional Application Ser. No. 61/637,068, filed Apr. 23, 2012, entitled "CODING OF VIDEO AND AUDIO", and Provisional Application Ser. No. 61/637,263, filed Apr. 23, 2012, entitled, "A NEW MPEG FILE FORMAT" the disclosures of which are incorporated herein by reference in their entirety.

BACKGROUND

Aspects of the present invention relate generally to the field of video processing, and more specifically to the encoding and decoding of video data.

In video coding systems, an encoder may code a source video sequence into a coded representation that has a smaller bit rate than does the source video and thereby achieve data compression. Using predictive coding techniques, some portions of a video stream may be coded independently (intra-coded I-frames) and some other portions may be coded with reference to other portions (inter-coded frames, e.g., P-frames or B-frames). Such coding often involves exploiting redundancy in the video data via temporal or spatial prediction, quantization of residuals and entropy coding. Previously coded frames, also known as reference frames, may be temporarily stored by the encoder for future use in inter-frame coding. Thus a reference frame cache stores frame data that may represent sources of prediction for later-received frames input to the video coding system. The resulting compressed data (bitstream) may be transmitted to a decoding system via a channel. To recover the video data, the bitstream may be decompressed at a decoder by inverting the coding processes performed by the encoder, yielding a recovered decoded video sequence.

When coded video data is decoded after having been retrieved from a channel, the recovered video sequence replicates but is not an exact duplicate of the source video. Moreover, video coding techniques may vary based on variable external constraints, such as bit rate budgets, resource limitations at a video encoder and/or a video decoder or the display sizes that are supported by the video coding systems. In many coding applications, there is a continuing need to maximize bandwidth conservation. When video data is coded for consumer applications, such as portable media players and software media players, the video data often is coded at data rates of approximately 8-12 Mbits/sec and sometimes 4 MBits/sec from source video of 1280×720 pixels/frame, up to 30 frames/sec.

In many systems, bandwidth is rising but latency is typically limited to a large extent by the speed signals travel, and therefore remains consistent or may even be rising due to buffer delays. Furthermore, many common file formats were not designed for modern media delivery techniques, notably streaming and one-to-many distribution (broadcast, multicast, application layer multicast or peer-to-peer distribution). Conventionally, bandwidth efficiency has been achieved when round-trip delay cost is amortized over larger data objects, such as segments. HTTP streaming is one example of an environment that addresses these issues but the format for such media in that instance is dependent on the delivery system.

Accordingly, there is a need in the art for a new file format designed to simplify and modernize existing file formats while still re-using existing formats as much as possible, to allow for easy conversion between delivery and storage, and optimization for media delivery.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

A new file format is presented, designed to simplify and modernize existing file formats. Conventional file types, including regular MP4 files may be automatically convertible into a file of the presented format. Data objects defined herein are incremental, capable of carrying a single stream or a package, re-packageable, and so on. A presentation can be represented as a packaged single media file, or as a plurality of tracks, or the un-timed data items such that the contents of the package may be stored separately. Presentations can also be fragmented in time, and the fragments collected into separate segments. According to an embodiment, a media fragment may contain a section of the timeline, including the media data whereas an initialization fragment may contain initialization information that may or may not be followed by media data. A segment of data may start with an initialization fragment.

Figure 1:
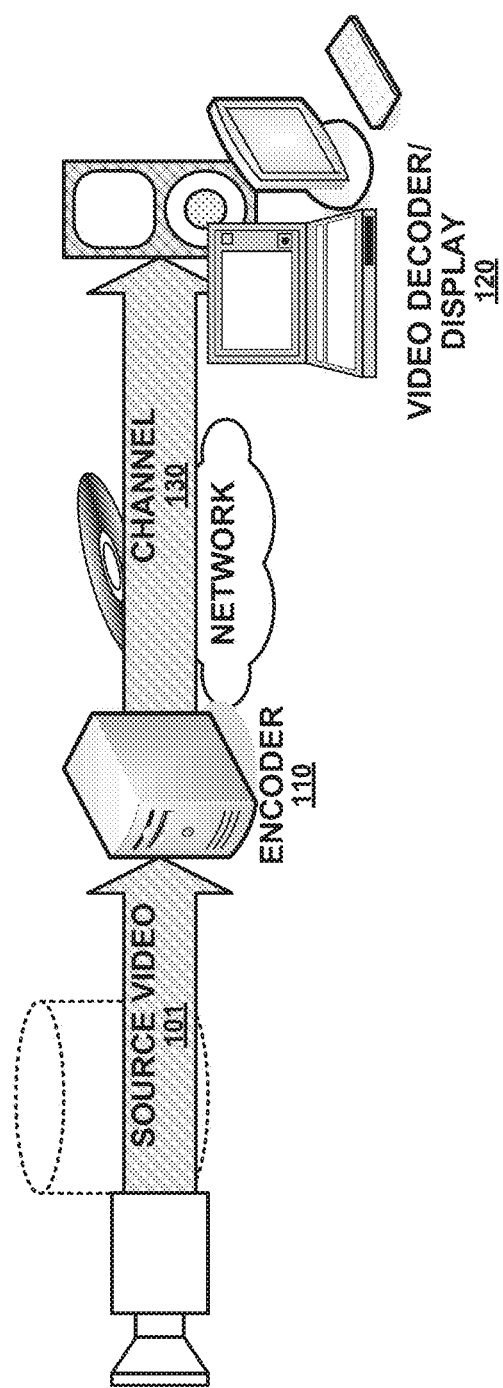
FIG. 1 is a simplified block diagram illustrating components of an exemplary video coding system according to an embodiment of the present invention.

FIG. 1 is a simplified block diagram illustrating components of an exemplary video coding system 100 according to an embodiment of the present invention. As shown in FIG.

1, an exemplary video coding system may include an encoder system 110 and a decoder system 120 provided in communication via a channel 130. The encoder system 110 may accept a source video 101 and may code the source video 101 as coded video, which typically has a much lower bit rate than the source video 101. The encoder system 110 may output the coded video data to the channel 130, which may be a storage device, such as an optical, magnetic or electrical storage device, or a communication channel formed by computer network or a communication network.

The terminals may exchange information as part of an initial handshake, for example information detailing the capabilities of each terminal. Each terminal may include an initialization table containing default parameters for encoding and decoding. The information exchanged during the handshake may then identify the coding format and default initialization table.

The decoder system 120 may have initialization information that may include coding patterns in the coded video data. For example, for time based coding techniques, the media data may consist of fragments that each may have various time-based characteristics. For example, each frame may have an associated time length, coding order and display order. A fragment may contain a sequence of frames for which the associated characteristics follow a predefined pattern. The pattern information may be exchanged during the handshake process or may otherwise be stored or transmitted with the coded video data. In some instances, the initialization information may define the default setup of data references, sample entries, etc. For a fragment of video data, associated initialization information may include tables that define such coding patterns. When such patterns are known, they can be indexed into. These patterns include sample size pattern, duration, timing, re-ordering, sample group membership, and other fragment characteristics that may be used to decode and display the coded video data.

The decoder system 120 may retrieve the coded video data from the channel 130, invert the coding operations performed by the encoder system 110 and output decoded video data to an associated display device. The decoder system 120 may access to initialization information associated with the retrieved coded video data. The initialization information may facilitate the decoding and/or display of the recovered media data.

According to an embodiment, the coding system 100 may include terminals that communicate via a network. The terminals each may capture video data locally and code the video data for transmission to another terminal via the network. Each terminal may receive the coded video data of the other terminal from the network, decode the coded data and display the recovered video data. Video terminals may include personal computers (both desktop and laptop computers), tablet computers, handheld computing devices, computer servers, media players and/or dedicated video conferencing equipment. As shown in FIG. 1, a pair of terminals are represented by the encoder system 110 and the decoder system 120. As shown, the coding system 100 supports video coding and decoding in one direction only. However, according to an embodiment, bidirectional communication may be achieved with an encoder and a decoder implemented at each terminal.

Figure 2:
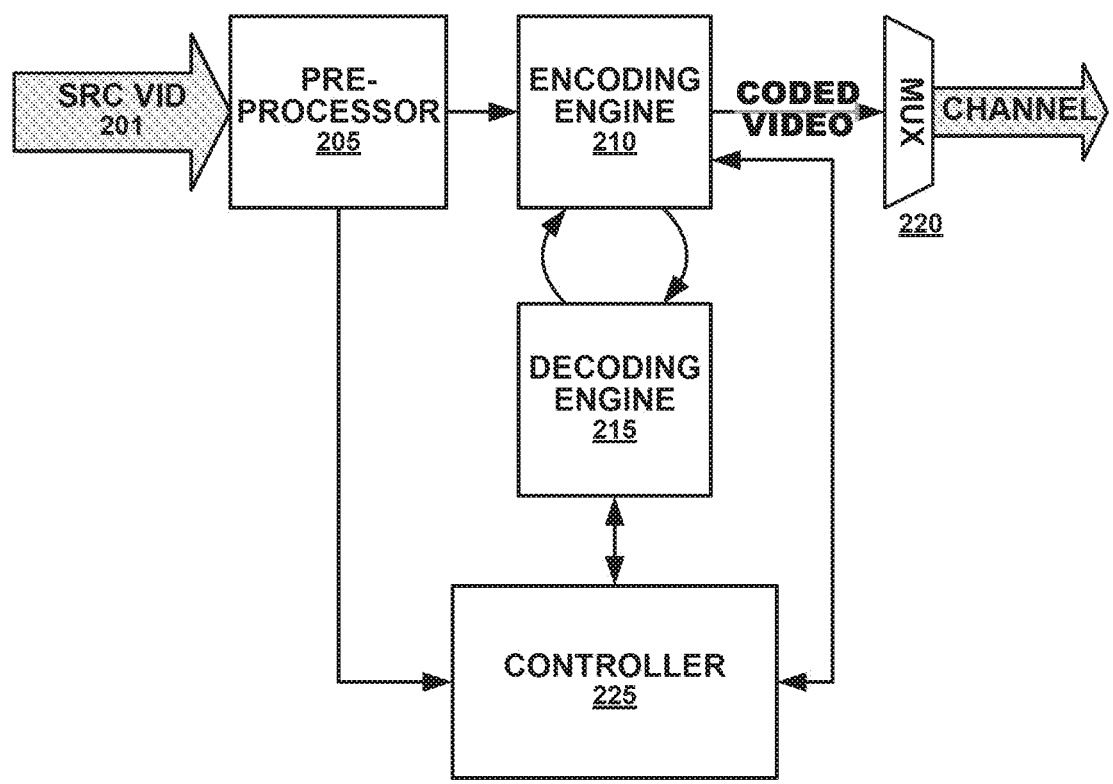
FIG. 2 is a simplified block diagram illustrating components of an exemplary encoder according to an embodiment of the present invention.

FIG. 2 is a simplified block diagram illustrating components of an exemplary encoder 200 according to an embodiment of the present invention. As shown in FIG. 2, the encoder 200 may include a pre-processor 205, a coding engine 210, a decoding engine 215, a multiplexer 220, and a controller 225. The encoder 200 may receive an input source video sequence 201 from a video source such as a camera or storage device. The pre-processor 205 may process the input source video sequence 201 as a series of frames and condition the source video for more efficient compression. For example, the image content of an input source video sequence may be evaluated to determine an appropriate coding mode for each frame. The pre-processor 205 may additionally perform video processing operations on the frames including filtering operations such as de-noising filtering, bilateral filtering or other kinds of processing operations that improve efficiency of coding operations performed by the encoder 200.

The coding engine 210 may receive the processed video data from the pre-processor 205 and generate compressed video. The coding engine 210 may operate according to a predetermined multi-stage protocol, such as H.263, H.264, or MPEG-2. The coded video data, therefore, may conform to a syntax specified by the protocol being used. The coding engine may additionally select from or be assigned one of a variety of coding modes to code the video data, where each different coding mode yields a different level of compression, depending upon the content of the source video. For example, the coding engine 210 may parse source video frames according to regular arrays of pixel data (e.g., 8×8 or 16×16 blocks), called "pixel blocks" herein, and may code the pixel blocks according to block prediction and calculation of prediction residuals, quantization and entropy coding.

The encoder 200 may further include a decode engine 215 that decodes the coded pixel blocks output from the coding engine 210 by reversing the coding operations performed therein. The decoding engine 215 may generate the same decoded replica of the source video data that a decoder system will generate, which can be used as a basis for predictive coding techniques performed by the coding engine 210. The decoding engine 215 may access the reference frame cache to retrieve reference data for decoding and to store decoded frame data that may represent sources of prediction for later-received frames input to the video coding system.

The coded frames or pixel blocks may then be output from the coding engine 210 and stored by the MUX 220 where they may be combined into a common bit stream to be delivered by the transmission channel to a decoder, terminal, or data storage. In an embodiment, the encoder 200 may transmit initialization information with the coded frames for a fragment of video data in logical channels established by the governing protocol for out-of-band data. As one example, used by the H.264 protocol, the encoder 200 may transmit accumulated statistics in a supplemental enhancement information (SEI) channel specified by H.264. In such an embodiment, the MUX 220 represents processes to introduce the initialization information in a logical channel corresponding to the SEI channel. When the present invention is to be used with protocols that do not specify such out-of-band channels, the MUX 220 may establish a separate logical channel for the noise parameters within the output channel.

During encoding, the controller 225 may monitor the operations of the preprocessor 205, the operations of the coding engine 210, the coded video data, and/or the recovered video data to identify patterns of certain characteristics. For example, patterns for the segment size, duration, timing, and re-ordering of video data may be identified. According to an embodiment, patterns may be limited to a specific segment size of the coded video data. The controller 225 may collect this information in an initialization table for each segment. The initialization information may then be transmitted on the channel with the associated coded video data. According to an embodiment, the controller 225 may control certain aspects of the coding engine, for example by setting coding parameters or segmenting the source video data, to ensure appropriate patterns are utilized.

Figure 3:
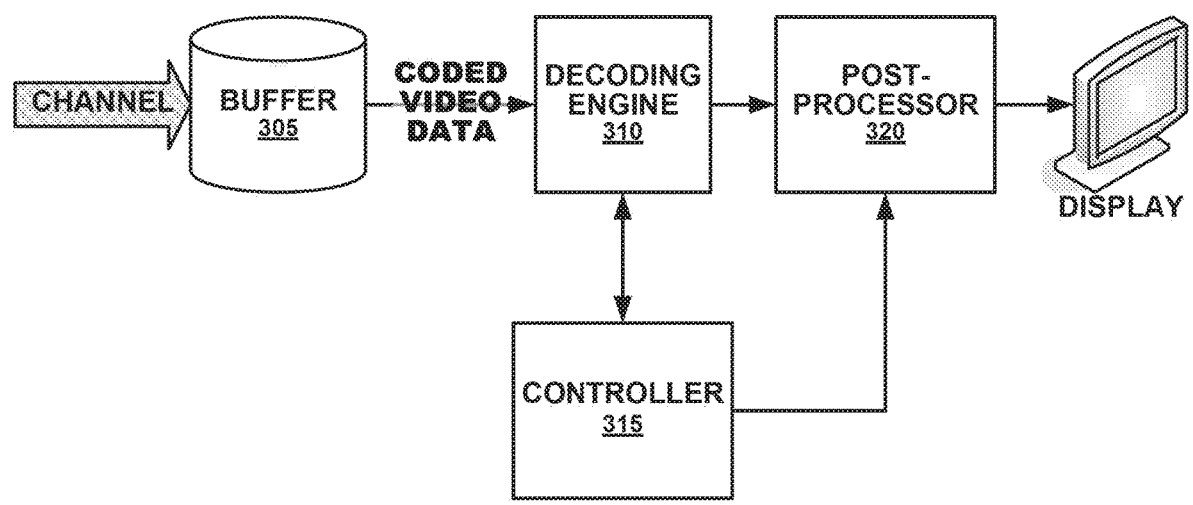
FIG. 3 is a simplified block diagram illustrating components of an exemplary decoder according to an embodiment of the present invention.

FIG. 3 is a simplified block diagram illustrating components of an exemplary decoder 300 according to an embodiment of the present invention. As shown in FIG. 3, the decoder 300 may include a buffer 305 to receive and store the coded channel data and to separate the coded video data from the initialization information, a decoding engine 310 to receive coded video data and inverse coding processes performed by an encoder, a controller 315 to identify the characteristics of the coded video data and select a decoding mode for the coded video data, and a post-processor 320 that further processes the decoded video to prepare it for display.

The decoder 300 may receive initialization information from the channel. For example, in a supplemental enhancement information (SEI) channel specified by H.264. In such an embodiment, the buffer 305 represents processes to separate the noise parameters from a logical channel corresponding to the SEI channel. However, when the present invention is to be used with protocols that do not specify such out-of-band channels, the buffer 305 may separate the noise parameters from the encoded video data by utilizing a logical channel within the input channel.

Initialization information may be utilized by the controller 315 to set certain parameters for the decoding engine 310 or to otherwise prepare the video data for display. For example, decoding parameters may be set for based on the known coding modes for each frame according to a predefined pattern. Initialization information may be stored at the controller 315 or in a separate memory device (not shown) accessible by the controller 315.

Post-processing operations may include filtering, de-interlacing, scaling or performing other processing operations on the decompressed sequence that may improve the quality of the video displayed with the post-processor. The processed video data may be displayed on a screen or other display or may be stored in a storage device for later use. The initialization information may be utilized to index the recovered video data and facilitate random access playback of the media.

Figure 4:
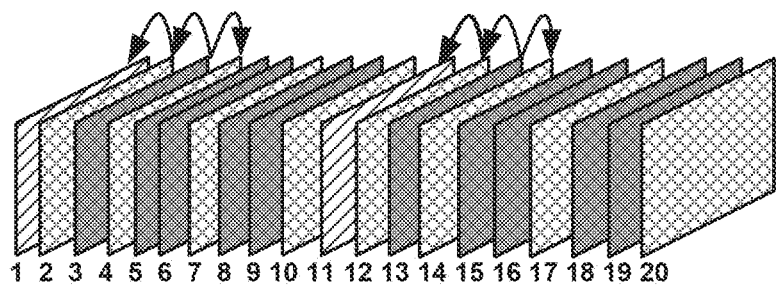
FIG. 4 illustrates an exemplary fragment having a pattern according to an embodiment of the present invention.

FIG. 4 illustrates an exemplary fragment having a pattern according to an embodiment of the present invention. As shown, the fragment includes a plurality of frames, the first frame (1) may be encoded as an I-frame, and a plurality of subsequent frames (2-10) may be coded as B- or P-frames. Then a subsequent frame (11) may be coded as an I frame and the plurality of subsequent frames (12-30) may be encoded in a similar pattern of B- and P-frames.

A long pattern may have sub-parts that cover common short patterns. A short pattern may regularly repeat. A fragment longer than a pattern may keep looping with the same pattern until the end of the fragment. If sequence-specific values are used such that the fragment does not follow a default or otherwise known pattern, then a table defining the pattern values may be transmitted from the encoder to the decoder with the fragment. If no information is transmitted, an implied pattern may be used, based on an initial offset into the default pattern and the length in the fragment.

The initialization information associated with the fragment may set a pattern for multiple characteristics. Patterns may be known for segment size, duration, timing, re-ordering, group membership, etc. For example, each pattern may be defined to have a fixed length. The pattern length may be shorter or longer than the total segment count in a fragment. The fragment may additionally indicate an initial offset into a specified pattern. The pattern may then be repeated as needed, to cover the entire fragment.

Figure 5:
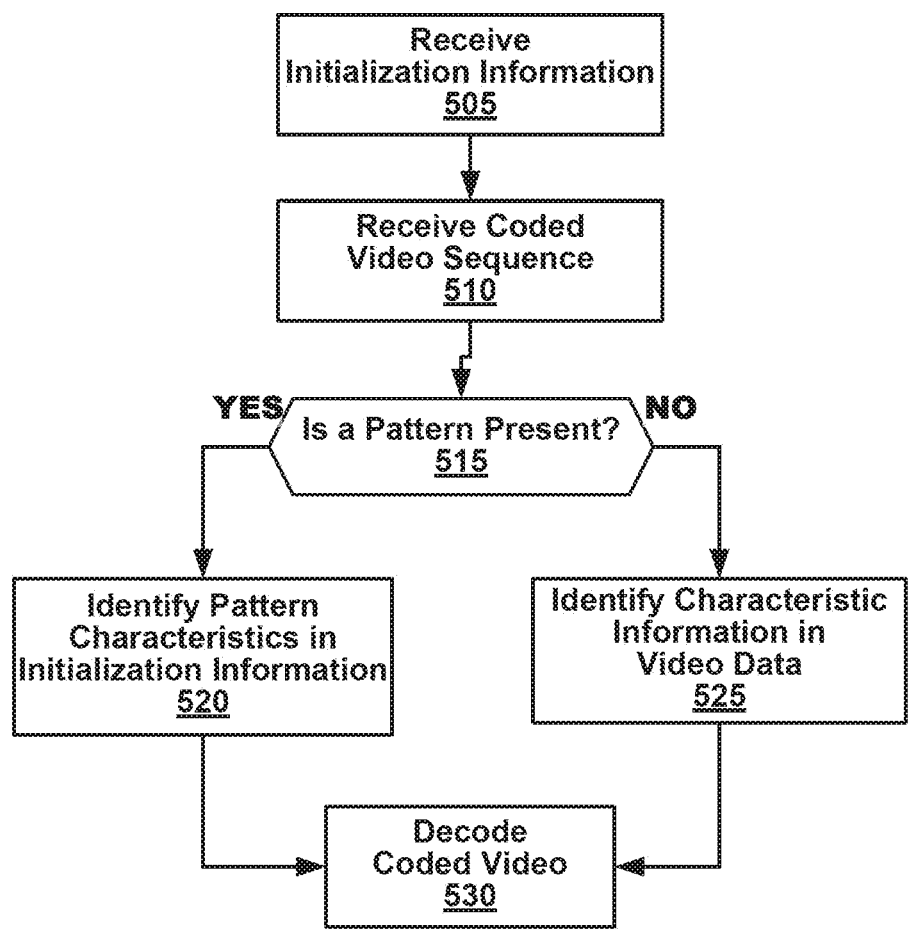
FIG. 5 is a simplified flow diagram illustrating an exemplary method for selecting pattern based defaults for decoding a coded video sequence.

FIG. 5 is a simplified flow diagram illustrating an exemplary method 500 for selecting pattern based defaults for decoding a coded video sequence. As shown in FIG. 5, an initialization table may be received at the decoder associated with a received coded video sequence (blocks 505, 510). The initialization table may define the default values of the patterns in the sequence. As previously noted, the initialization table may be transmitted to the decoder during an initial handshake process between terminals, or may be transmitted with each associated fragment of video data. A fragment having initialization information within the fragment may be known as an initialization fragment. The initialization information may define the patterns for the media data associated with the fragment or may define the patterns for a plurality of media fragments, including all the fragments in an associated segment or file.

Then for fragments not having an associated initialization table (block 515), the decoder may identify a pattern and characteristic information associated with the identified pattern. A need for the pattern identification may be signaled by the lack of a table associated with the segment. For known patterns, the predefined defaults may then be used. For frames not a part of any predefined pattern, the characteristic values may be included in the coded video data (block 525).

For fragments having an associated initialization table (block 515), the decoder may then identify the characteristic values for the frames in the sequence (block 520). A pattern will have a corresponding set of defaults that may be the same for every frame following the pattern. Then the decoder may decode the coded video using the characteristic values previously identified (block 530).

Figure 6:
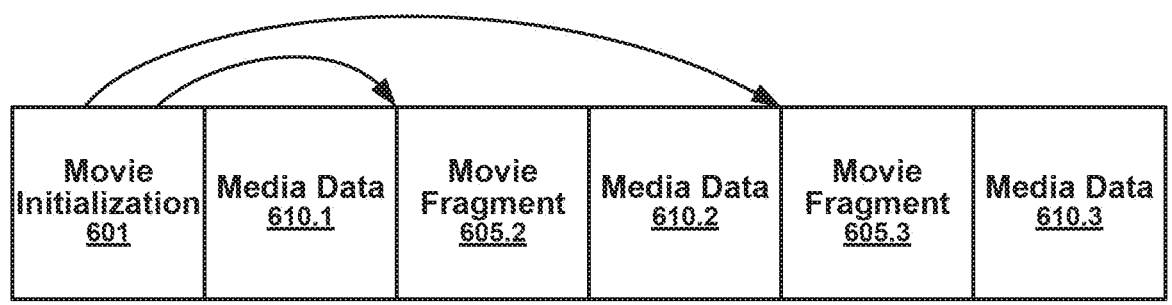
FIG. 6 illustrates an exemplary video file having a plurality of movie fragments indexed by the initialization information according to an embodiment of the present invention.

FIG. 6 illustrates an exemplary video file 600 having a plurality of movie fragments 605 indexed by the initialization information 601 according to an embodiment of the present invention. Each movie fragment 605.1-N may have a defined start time and duration, and if stored contiguously, have a known starting byte and size. Movie fragments may be implemented such that the initialization table may be used to access each fragment in a file. Once a fragment 605.1-N is accessed, the associated media data 610.1-N may be known and available for display or playback. A table, and marking on the fragments, may then allow for random access of a portion of media data without requiring the decoding unit to parse the entire movie for playback.

Figure 7:
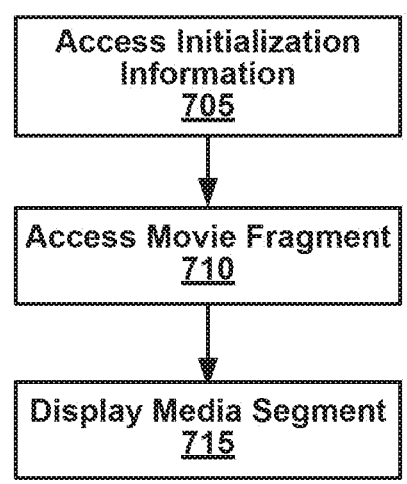
FIG. 7 is a simplified flow diagram illustrating an exemplary method for randomly accessing a portion of a media file according to an embodiment of the present invention.

FIG. 7 is a simplified flow diagram illustrating an exemplary method 700 for randomly accessing a portion of a media file according to an embodiment of the present invention. As shown in FIG. 7, to display a portion of a media file, a decoder may access the received initialization information for the file (block 705). As previously noted, the initialization information may include characteristic information for the file and include a table that identifies the size or duration of each of a plurality of fragments within the file. According to an embodiment, the initialization information may be transmitted to the decoder with the file, with each associated fragment, or may be exchanged in an initial handshake process between terminals. The initialization table associated with a file or fragment may then be stored therewith. In order to access a requested fragment, the controller may parse the table to identify the start of the relevant media file and any characteristics that carry from the initialization information throughout the file and are applicable to the requested fragment.

The decoder may then access the initialization information associated with the fragment information (block 710). As previously noted, the fragment information may include characteristic information for the fragment. The requested media may then be displayed using the characteristic information accessed in the initialization information to identify the start of the fragment and any other necessary information for appropriate display (block 715).

Figure 8:
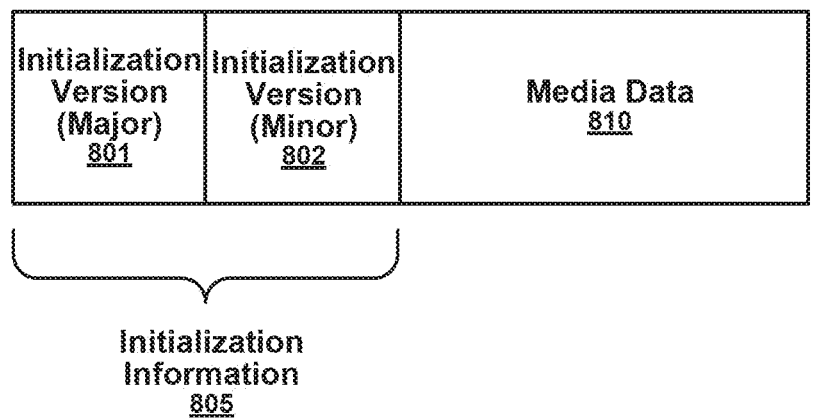
FIG. 8 illustrates an exemplary fragment of coded video data having carouseling initialization information according to an embodiment of the present invention.

FIG. 8 illustrates an exemplary fragment of coded video data 800 having carouseling initialization information according to an embodiment of the present invention. Initialization information 805 for media data 810 may be periodically dumped or updated, for example, when streaming data. A conventional decoder displaying the media data 810 will then reinitialize the settings and characteristics for the media data each time an initialization fragment is received. As shown in FIG. 8, initialization information having carouseling version data may indicate whether re-initialization is required, thereby avoiding unnecessary re-initialization.

As shown in FIG. 8, the received initialization information 805 may give a major 801 and minor 802 version number, documenting whether re-initialization is needed when a new initialization packet is encountered or just an update is required. Both sync and non-sync initialization fragments may be included in the initialization information 805. For example, the initialization version (major) 801 may indicate whether a complete re-initialization is required, for example, if the streaming information is switching between different codecs. Whereas the initialization version (minor) 802 may indicate whether an update of the initialization information is required.

According to an embodiment, the initialization information 805 for the fragment may contain an edit list such that if an update is to be applied to the whole media the edit list may be replaced in a carouseled version of the initialization segment. If a new edit list maps the media data to the same presentation times, the edit list indicates a minor update to the initialization segment. Otherwise, it indicates a major (re-initialization) update.

For example, for pair of initialization fragments 805 received at the decoder, if the two versions 801, 802 are identical in both fragments, the initialization information is identical and the latter received initialization fragment is a resend of the known initialization fragment. If the major version 801 is identical, but the minor version 802 has changed between the two received fragments, then the later received fragment is a compatible update. For example, a fragment may be compatible if it includes additional metadata that applies to the whole duration of the presentation but does not require a re-initialization. However, if the major version 801 has changed from a first received fragment to a latter received fragment, then the latter received fragment contains new initialization information and requires a re-initialization.

According to another embodiment, a fragment 800 that contains an initialization fragment 805 can be marked as a random access point in the index for the file. Then for a minor version 802 change, the update initialization fragment may contain the difference between the original initialization fragment and the update fragment. Then each subsequent segment may be either an independent (I) segment when the major version 801 indicates a re-initialization or a predictively (P) coded segment when the minor version 802 identifies changes to be made to the data of the I segment data.

Figure 9:
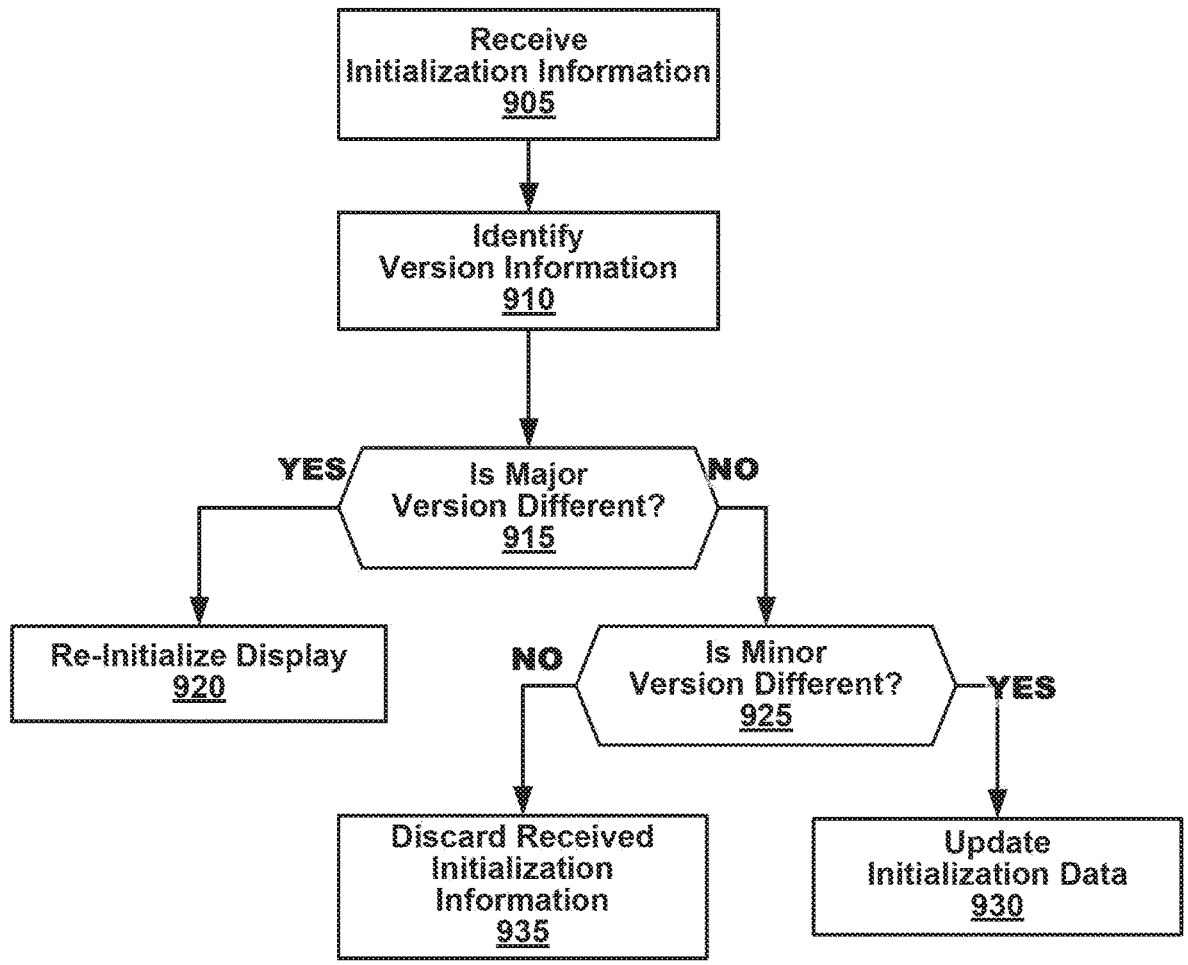
FIG. 9 is a simplified flow diagram illustrating an exemplary method for identifying initialization update information in a stream of video data according to an embodiment of the present invention.

FIG. 9 is a simplified flow diagram illustrating an exemplary method 900 for identifying initialization update information in a stream of video data according to an embodiment of the present invention. As shown in FIG. 9, a decoder may receive initialization information for data being streamed to the decoder (block 905). The initialization information may contain version information, major and minor, that identifies the version of the data (block 910). The version of the received initialization data may then be compared to the version of the currently utilized initialization data (block 915).

If the version information includes a major identification and a minor identification, and the major identification for the received initialization data is different than the major identification for the currently utilized initialization data, the decoder should be reinitialized using the received initialization data (block 920).

However, if the major versions are the same, but the minor versions are different, the received initialization data indicates that a change to the initialization information should occur (block 925). Such changes may include updating the edit table or replacing other information in the currently utilized initialization data by the information in the received initialization data (block 930). If the major and minor versions on both the received information data and the currently utilized information data are the same, the received information may be discarded (block 935).

As discussed above, FIGS. 1, 2, and 3 illustrate functional block diagrams of terminals. In implementation, the terminals may be embodied as hardware systems, in which case, the illustrated blocks may correspond to circuit sub-systems. Alternatively, the terminals may be embodied as software systems, in which case, the blocks illustrated may correspond to program modules within software programs. In yet another embodiment, the terminals may be hybrid systems involving both hardware circuit systems and software programs. Moreover, not all of the functional blocks described herein need be provided or need be provided as separate units. For example, although FIG. 2 illustrates the components of an exemplary encoder, such as the pre-processor 205 and coding engine 210, as separate units. In one or more embodiments, some components may be integrated. Such implementation details are immaterial to the operation of the present invention unless otherwise noted above. Similarly, the encoding, decoding and post-processing operations described with relation to FIGS. 5, 7, and 9 may be performed continuously as data is input into the encoder/decoder. The order of the steps as described above does not limit the order of operations.

Some embodiments may be implemented, for example, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information.

Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

I claim:

1. A method, comprising:
   performing pattern recognition on a data stream to be transmitted via a channel to detect patterns and a data length of each pattern;
   when the pattern is detected:
   encoding first information comprising content of the pattern and second information comprising the pattern's data length, wherein the first information and the second information are different, and
   altering the data stream by replacing instance(s) of the pattern in the data stream with a symbol representing the pattern and a repeat duration of the pattern, the repeat duration indicating a duration of consecutive instances of the pattern that occur in the data stream;
   transmitting initialization information including the first information and the second information to a channel; and
   transmitting the altered data stream to the channel.

2. The method of claim 1, wherein data stream represents encoded media samples, and the duration of the repetition is measured in media samples.

3. The method of claim 1, wherein:
   the initialization information includes a table of the detected patterns and their respective pattern data lengths.

4. The method of claim 3, further comprising:
   encoding changes to initialization information with a minor version number.

5. The method of claim 1, wherein the duration of the repetition is longer than the pattern's data length.

6. The method of claim 1, further comprising:
   determining an initial offset into the pattern; and
   wherein the instances of the pattern are replaced additionally with an identification of the initial offset.

7. The method of claim 1, wherein each element of the pattern includes a plurality of coding parameters.

8. An encoder, comprising:
   an encoder, and
   a controller configured to:
   perform pattern recognition on a data stream to be transmitted via a channel to detect patterns and a data length of each pattern;
   when the pattern is detected:
   encode first information comprising content of the pattern and second information comprising the pattern's data length, wherein the first information and the second information are different, and
   alter the data stream by replacing instance(s) of the pattern in the data stream with a symbol representing the pattern and a repeat duration of the pattern, the repeat duration indicating a duration of consecutive instances of the pattern that occur in the data stream;
   transmitting initialization information including the first information and the second information to a channel; and
   transmit initialization information and the altered data stream to the channel.

9. The encoder of claim 8, wherein data stream represents encoded media samples, and the duration of the repetition is measured in media samples.

10. The encoder of claim 8, wherein:
    the initialization information includes a table of the detected patterns and their respective pattern data lengths.

11. The encoder of claim 10, wherein the controller is further configured to:
    encode changes to initialization information with a minor version number.

12. The encoder of claim 8, wherein the duration of the repetition is longer than the pattern's data length.

13. The encoder of claim 8, wherein the controller is further configured to:
    determine an initial offset into the pattern; and
    wherein the instances of the pattern are replaced additionally with an identification of the initial offset.

14. The encoder of claim 8, wherein each element of the pattern includes a plurality of coding parameters.

15. A non-transitory medium storing instructions that, when executed by a processor, cause:
    performing pattern recognition on a data stream to be transmitted via a channel to detect patterns and a data length of each pattern;
    when the pattern is detected:
    encoding first information comprising content of the pattern and second information comprising the pattern's data length, wherein the first information and the second information are different, and
    altering the data stream by replacing instance(s) of the pattern in the data stream with a symbol representing the pattern and a repeat duration of the pattern, the repeat duration indicating a duration of consecutive instances of the pattern that occur in the data stream;
    transmitting initialization information including the first information and the second information to a channel; and
    transmitting the altered data stream to the channel.

16. The medium of claim 15, wherein data stream represents encoded media samples, and the duration of the repetition is measured in media samples.

17. The medium of claim 15, wherein:
    the initialization information includes a table of the detected patterns and their respective pattern data lengths.

18. The medium of claim 17, wherein the instructions further cause:
    encoding changes to the initialization information with a minor version number.

19. The medium of claim 15, wherein the duration of the repetition is longer than the pattern's data length.

20. The medium of claim 15, wherein the instructions further cause:
    determining an initial offset into the pattern; and
    wherein the instances of the pattern are replaced additionally with an identification of the initial offset.

21. A method, comprising:
    performing pattern recognition on a data stream to be transmitted via a channel to detect patterns and a data length of each pattern, wherein the data stream includes coding parameters and coded data, and the coded data is coded with the coding parameters;
when the pattern of the coding parameters is detected:
encoding information comprising content of the pattern and the pattern's data length, and
altering the data stream by replacing instance(s) of the pattern of the coding parameters in the data stream with a symbol representing the pattern and a repeat duration of the pattern, the repeat duration indicating a duration of consecutive instances of the pattern that occur in the data stream; and
transmitting the altered data stream to a channel.

* * * * *